United States Patent Office 3,422,990
Patented Jan. 21, 1969

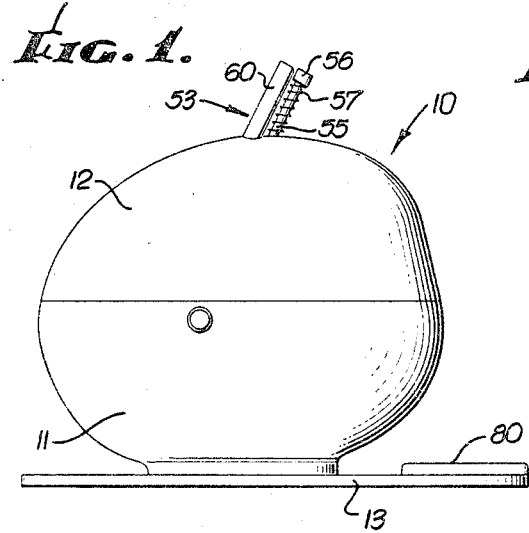
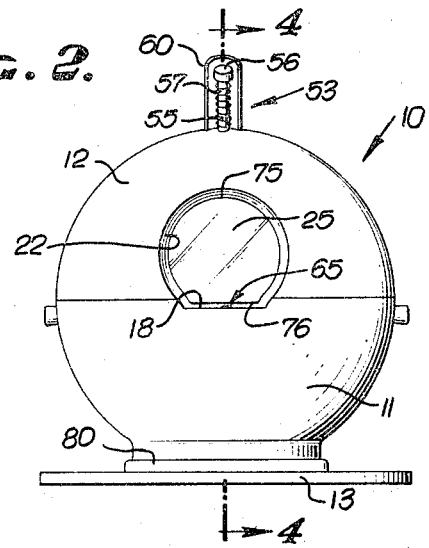
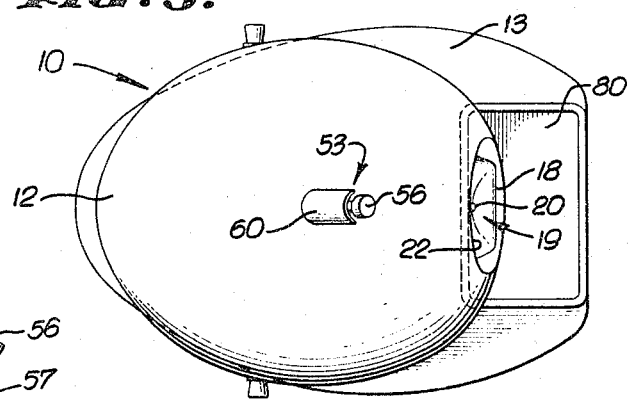
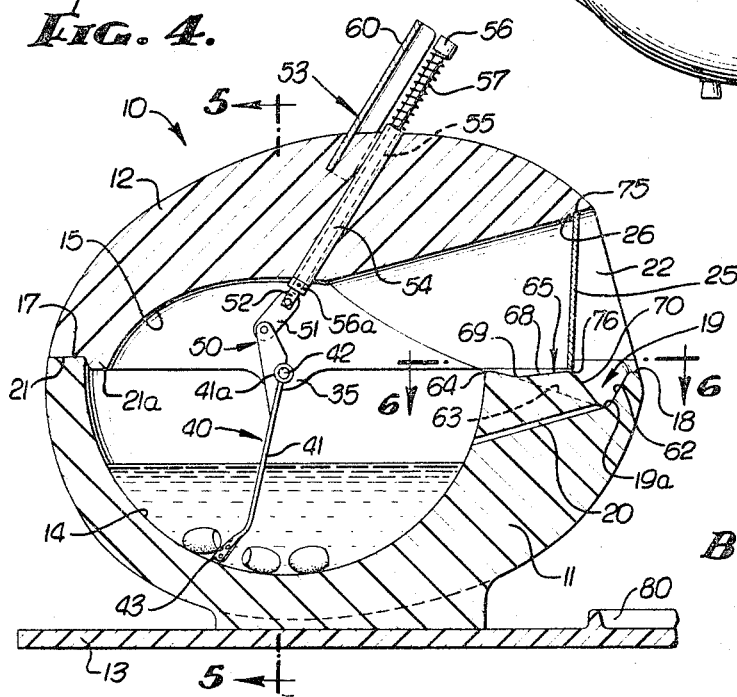

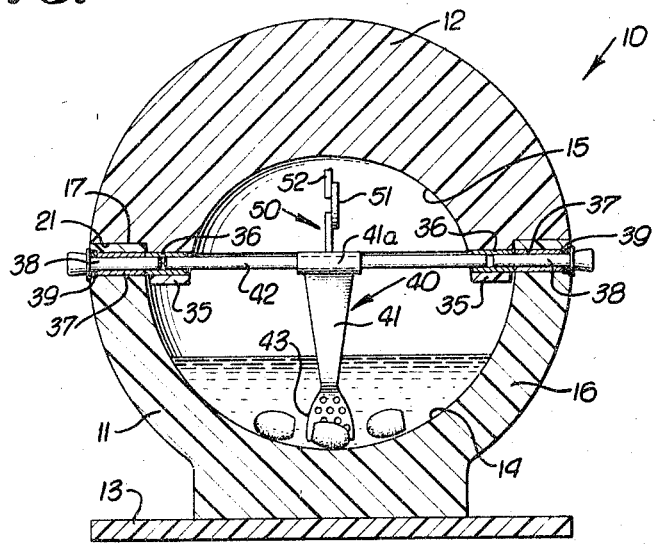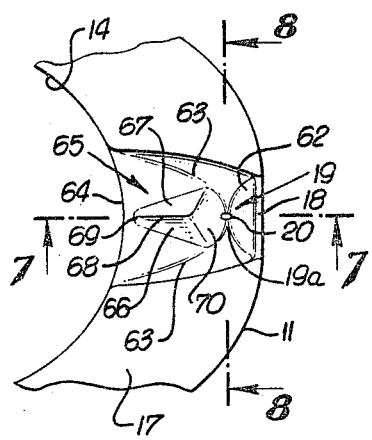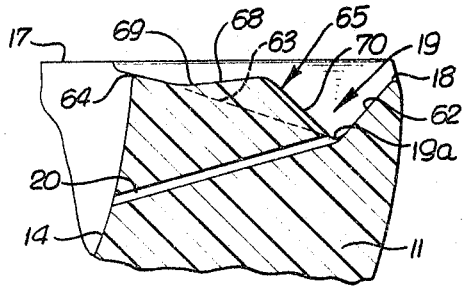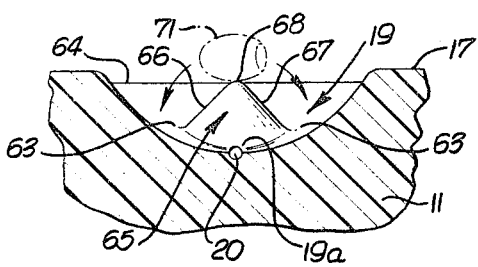

3,422,990
DISPENSING APPARATUS DELIVERING ARTICLES TO RAISED STATIONARY ARTICLE SUPPORT
Burl T. Wood, Lindsay, Calif., assignor to Consolidated Olive Growers, Lindsay, Calif., a corporation of California
Filed Nov. 17, 1967, Ser. No. 683,890
U.S. Cl. 221—192                                           9 Claims
Int. Cl. G07f 11/44

ABSTRACT OF THE DISCLOSURE

An apparatus for dispensing food articles, such as olives, which are immersed in liquid in a receptacle. A scoop member is actuated from outside the receptacle to move through the food articles and deposit an individual article upon a shelf whereupon the article may be removed therefrom by a consumer. Means are provided to prevent liquid in the receptacle from splashing upon the consumer when the scoop member is actuated too rapidly, and for causing liquid in a hollow food article to drain therefrom when the article is deposited upon the shelf.

Background of the invention

This invention relates to an apparatus for individually dispensing articles such, for example, as olives, cherries, prunes, pickled onions, pineapple chunks, and other prepared or cured edible food articles of a generally solid nature which can be retained in a brine or syrup, depending upon the type of article.

The invention comprises an improvement upon the dispensing apparatus disclosed in my Patent No. 3,310,200. Generally speaking, the dispenser disclosed in the aforementioned patent comprises a liquid impervious receptacle for containing the food articles in a brine or syrup. A passage is provided in the receptacle which extends from the interior to the exterior thereof, and a shelf is formed on the lower portion of this passage for reception of a food article. The passage is normally closed with a plate which includes a swingable door that opens for dispensing an individual article of food upon the shelf, the food article being seized by a scoop moving through the liquid against the mass of food articles and swept upwardly toward the door which is opened as an article is deposited upon the shelf, whereupon it may be grasped by the consumer. The scoop is manually actuated by means of a plunger which is accessible from the exterior of the receptacle.

While the above described dispenser is generally satisfactory for most applications, it has a deficiency when the food article being dispensed is one which has an open cavity therein that retains liquid. An example of such a food article is a pitted olive, which has a generally cylindrical configuration with rounded ends and a cavity opening at one of the ends thereof caused by the removal of the pit from the olive. Normally, when the scoop moves through the liquid in which the olives are retained in the dispenser, some liquid will remain in the cavity of the olive which is being deposited upon the shelf. Because the olive will often roll along its cylindrical surface to the lowermost portion of the shelf, liquid will still be retained in the olive cavity. As a consequence, sometimes the liquid within the olive falls upon the consumer's clothing when the consumer raises the olive to his mouth. Hence, it would be desirable to have some means for ensuring that most all of the liquid which might be retained in a cavity of the food article will be drained therefrom before the article is removed from the shelf by a consumer.

While the dispenser disclosed in said previous patent is otherwise quite satisfactory, if the actuating device for the scoop is operated with too great a force by the consumer, occasionally liquid from within the receptacle will splash outwardly through the swingable door upon the consumer when the food article is being deposited upon the shelf of the dispenser. Thus, it would also be desirable to have means on the dispenser for preventing splashing of liquid outwardly upon the consumer.

Summary of the invention

It is, therefore, a principal object of the present invention to provide a dispenser of the character identified, with means to cause removal of liquid in hollow food articles deposited upon the shelf of the dispenser.

A further object of the invention is to provide in a device of this character means for preventing liquid within the receptacle of the dispenser from splashing upon the consumer when the article dispensing scoop is actuated with too great a force.

According to a principal aspect of the present invention, a dispenser of the type disclosed in the aforementioned patent is provided with a raised crown on the dished shelf of the dispenser. The crown is positioned so as to be engaged by a food article deposited upon the shelf by the scoop member of the dispenser, and shaped to effect rocking movement of the article when rolling to the lowermost portion of the shelf. Hence, when the food article is a pitted olive, for example, which contains liquid in its cavity, when the olive is deposited upon the shelf, the liquid will flow out of the cavity during the rocking movement of the olive to the bottom of the shelf. Liquid draining out of the cavity of the olive and off its outer surface returns to the interior of the dispenser by means of a liquid drain channel opening at the lowermost portion of the shelf. Consequently, once the olive reaches the bottom of the shelf, it may be withdrawn therefrom by a consumer without the danger of liquid falling upon the consumer's clothing.

According to another aspect of the invention, a stationary plate, preferably of a transparent material, is positioned within the passage of the dispenser with its lower edge at an elevation sufficient to permit a food article to pass thereunder when deposited upon the shelf of the dispenser, yet at an elevation sufficient to prevent liquid in the receptacle from splashing outwardly through the passage due to too rapid movement of the scoop caused by a consumer actuating the scoop with an excessive amount of force. Thus, the problem of liquid splashing upon the consumer by actuating the scoop too rapidly in my previous dispenser is eliminated by my present invention.

Other objects, aspects and advantages of the invention will become apparent from the following description taken in connection with the accompanying drawings.

Brief description of the drawings

FIGURE 1 is a side elevation of the dispensing apparatus;

FIGURE 2 is a front elevation of the same;

FIGURE 3 is a top plan view of the same;

FIGURE 4 is a vertical sectional view taken along line 4—4 of FIGURE 2;

FIGURE 5 is a vertical sectional view taken along line 5—5 of FIGURE 4;

FIGURE 6 is a horizontal sectional view taken along line 6—6 of FIGURE 4;

FIGURE 7 is an enlarged vertical sectional view taken along line 7—7 of FIGURE 6; and FIGURE 8 is an enlarged vertical sectional view taken along line 8—8 of FIGURE 6.

Description of the preferred embodiment

The dispenser 10 comprises a base section 11 and a cover 12. The base section is mounted on a flat base member 13. The two sections together form a receptacle wherein the base member 11 defines a bowl 14 which is preferably of a generally hollow spherical configuration. The cover 12 is hollowed out as at 15 to provide operating room for part of the linkage hereinafter described in more detail. The sections 11 and 12 are preferably made of a lightweight plastic material, relatively thick for thermal insulation qualities and for other mechanical purposes which will be noted, and finished with a liquid impervious skin on the lining of the bowl and of the cavity 15, as well as on other exposed surfaces.

The wall 16 of the base section 11 terminates in a rim 17. The rim lies in a generally flat plane except at the front where it is depressed as at 18 to form a dished shelf 19. Communicating at the bottom of the shelf 19 is an inclined channel 20, provided through the wall 16, for return of liquid to the bowl 14.

Cover 12 is provided with a surface 21 complementary to the rim 17, and with a flange 21a which seats on the inside of the section 11 and cooperates in properly orienting the two sections 11 and 12.

The surface 21 is interrupted at the front to provide an opening 22 which, in conjunction with the depression 18 and shelf 19, forms a generally circular passage from the interior of the receptacle to the exterior thereof.

This passage is restricted by a plate 25, preferably transparent. The opening 22 has an outwardly facing arcuate shoulder 26 thereon intermediate the interior and exterior of the receptacle. The plate 25 is mounted to said shoulder by means of a suitable epoxy cement or the like. Preferably, the flange 21a on the cover 12 extends into the shelf 19 as far as the plate 25, to further insure proper positioning of the section 11 and cover 12.

As seen in FIGURE 5, the flange 21a of the cover section 12 is augmented by a boss 35 at each side to provide mounting means for sleeves 36. Second sleeves 37 are disposed in opposite sides of the base section 11 in the region of the rim 17 and are coaxial with the sleeves 36. This enables the sections 11 and 12 to be secured together by sliding pins 38 which may be advanced to extend into the sleeves 36 to lock the two sections together, or may be withdrawn from the sleeves 36 to permit removal of the cover 12 from the base section 11. Preferably, O-rings 39 are disposed in recesses at one end of the sleeves 37 to provide friction against the pins 38 for holding the pins in their locking position.

A scoop member 50 includes a handle section 46 with a hub 41a rotatably mounted at one end on a shaft 42. The ends of this shaft are fixedly mounted in the sleeves 36, as for example, by epoxy cement. At the other end of the handle is a spoon-like member 43, preferably perforated to avoid capture of liquid, and to facilitate movement of the spoon-like member through the liquid in the bowl. The movement of the scoop member about the axis of the shaft 42 enables the spoon-like end 43 to closely traverse the curved surface of the bowl 14 from the bottom thereof to the discharge passage 22.

A bell crank element 50 extends from the hub 41a, as best seen in FIGURE 4. This bell crank element is pivotally connected to an arm 51 which in turn is pivotally connected to the lower end 52 of a plunger assembly 53. This plunger assembly includes a sleeve 54 mounted obliquely in the wall of the cover section 12, and provides a slide bearing for a plunger rod 55, topped by a thumb button 56 and provided with a stop collar 56a near the other end; a compression spring 57 is interposed between the thumb button and the upper end of the sleeve 54. Depressing the thumb button 56 causes rotation of the bell crank element 50 and consequent arcuate movement of the scoop member 40 in an anticlockwise direction, as viewed in FIGURE 4. Removal of pressure from the thumb button 56 frees the spring for action to return the rod 55 to its outermost position, and consequently, the scoop 40 to its substantially vertical position.

There is preferably included a guard member 60 in the form of a fragment of a cylinder mounted in the wall body of the cover section 12 adjacent to and partially encircling the protruding portion of the plunger assembly.

As best seen in FIGURES 6–8, the shelf 19 includes a vertically curved forward ramp 62 extending between the forward edge of the shelf at 18 and the curved bottom 19a thereof, and also an inclined rear ramp 63 which extends from the bottom 19a to the rear edge 64 of the shelf adjacent to the bowl 14.

In accordance with one feature of the invention, a wedge-shaped crown 65 is provided on the rear ramp 63. The crown has generally flat triangular side surfaces 66 and 67 which converge together at their upper portions to an upper edge 68, and at their rear portions to a pointed rear end 69 adjacent to the rear edge 64 of the shelf. The wedge 65 also includes a rearwardly inclined convex front face 70 which terminates rearwardly of the bottom 19a of the shelf. The upper edge 68 of the crown is slightly inclined from the pointed rear end 69 upwardly toward the upper end of the front face 70, as best seen in FIGURE 7.

By way of example, and not by way of limitation, when a pitted olive is deposited upon the rear edge 64 of the shelf 19a by the scoop member 40, the olive will most likely assume the position indicated at 71 in FIGURE 8, wherein the cylindrical side surface of the olive will engage the upper edge 68 of the crown 65, and liquid will be retained within the cavity of the olive. The olive will fall to either one or the other sides of the crown, rocking and tumbling down the valleys provided between the sides of the crown and the sides of the ramp until it reaches the bottom 19a of the shelf, whereupon continued rocking motion of the olive will result due to the convex front face 70 of the crown 65 and the curved bottom of the shelf. During such rocking and tumbling motion of the olive, there is a high probability that the olive will be sufficiently inclined so that liquid within the cavity of the olive will drain therefrom to the bottom of the shelf and drain from there through the channel 20 back to the bowl 14. Thus, by the time the olive reaches the bottom 19a of the shelf, it is relatively free of any liquid.

According to another feature of the invention, the plate 25 is a solid stationary element, as contrasted to the plate in the aforementioned patent which employs a hinged door. The plate 25 is generally vertically disposed, with its upper edge 75 disposed slightly forwardly of its bottom edge 76. As seen in FIGURE 4, the lower edge 76 of the plate is disposed intermediate the forward edge 18 and rear edge 64 of the shelf 19, and preferably disposed slightly above the upper edge 68 of the crown and approximately above the upper end of the forward face 70 thereof, so as not to obstruct the movement of a food article down the ramp 63 to the bottom of the shelf, or to restrict access of a consumer to the article on the shelf from the front of the dispenser. It is also preferred that the lower edge 76 of the plate 25 be generally in horizontal alignment with the inner edge 64 of the shelf to insure that any liquid which is splashed outwardly into the passage 22, when the scoop member 40 is moved too rapidly by a consumer, will strike the plate and drain downwardly into the shelf 19 rather than splash out upon the consumer.

There is also provided on the flat base member 13 a tray 80, vertically aligned under the opening 22, which is adapted to receive absorbent paper (not shown) so that should there be any excess liquid remaining on the food being removed by the consumer, it will be caught by the tray and absorbent paper.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures and devices.

I claim:

1. An apparatus for individually dispensing solid articles comprising a closed receptacle formed of walls impervious to liquid and having a passage extending from the interior to the exterior thereof, a dished shelf contiguous to said passage for reception of an article and accessible from the exterior of the receptacle, a plate mounted in and restricting said passage, a scoop member shiftably mounted within said receptacle to propel an article from the interior of the receptacle through the passage for deposit on the shelf, means connected with the scoop member for actuating the same, said means being accessible from the exterior of the receptacle for manual operation, said receptacle comprising a bowl with a circular slope from the bottom to the passage, the scoop member comprising a handle pivotally mounted on a horizontal axis and an outer spoon-like end disposed to traverse the circular slope of the bowl, and a liquid drain channel leading from the shelf into the bowl wherein the improvement comprises: said dished shelf including a bottom and a raised crown positioned so as to be engaged by an article deposited on said shelf by said scoop member and shaped to effect rocking movement of the article when rolling to the bottom of said shelf.

2. An apparatus as set forth in claim 1, wherein said dished shelf has a forward edge adjacent to the exterior of said receptacle and a rear edge adjacent to said bowl, said bottom lying between said forward and rear edges, said shelf including an inclined ramp extending from said bottom to said rear edge, and said crown being on said rear ramp.

3. An apparatus as set forth in claim 2, wherein said crown is generally wedge-shaped and includes a pointed end adjacent to said rear edge and an upper edge extending from said pointed end toward said forward edge of said shelf.

4. An apparatus as set forth in claim 1, wherein said plate is stationary and has a lower edge at an elevation sufficient to permit an article to pass thereunder when deposited on said shelf and to prevent liquid in the bowl from splashing outwardly through said passage due to rapid movement of said scoop member in said bowl; and said plate being disposed in said passage so as to permit access to an article at the bottom of said shelf from the exterior of said receptacle.

5. An apparatus as set forth in claim 4, wherein said plate is disposed forwardly of said rear edge of said shelf, and the lower edge of said plate is generally in horizontal alignment with said rear edge.

6. An apparatus as set forth in claim 4, wherein said passage has an upper forwardly facing shoulder thereon intermediate the forward and rear edges of said shelf, and the upper periphery of said plate is mounted against said shoulder.

7. An apparatus for individually dispensing solid articles comprising a closed receptacle formed of walls impervious to liquid and having a passage extending from the interior to the exterior thereof, a dished shelf contiguous to said passage for reception of an article and accessible from the exterior of the receptacle, a plate mounted in and restricting said passage, a scoop member shiftably mounted within said receptacle to propel an article from the interior of the receptacle through the passage for deposit on the shelf, means connected with the scoop member for actuating the same, said means being accessible from the exterior of the receptacle for manual operation, said receptacle comprising a bowl with a circular slope from the bottom to the passage, the scoop member comprising a handle pivotally mounted on a horizontal axis and an outer spoon-like end disposed to traverse the circular slope of the bowl, and a liquid drain channel leading from the shelf into the bowl wherein the improvement comprises: said plate being stationary and being disposed in said passage so as to permit access to an article on said shelf from the exterior of said receptacle; said dished shelf including a forward edge adjacent to the exterior of said receptacle, a rear edge adjacent to said bowl and a bottom lying between said edges; said shelf including also a forward inclined ramp extending from said forward edge to said bottom, and a rear inclined ramp extending from said bottom to said rear edge; a wedge-shaped crown on said near ramp including a pointed end adjacent to said rear edge and a front face adjacent to said bottom, said crown also including an upper edge extending from said pointed end toward said front face; said upper edge of said crown being disposed below said lower edge of said plate, and said lower edge of said plate being generally in horizontal alignment with said rear edge of said shelf.

8. An apparatus as set forth in claim 7, wherein said lower edge of said plate is forward of said rear edge of said shelf and rearward of said bottom.

9. An apparatus as set forth in claim 8, wherein said plate is generally vertically disposed and formed of transparent material.

References Cited

UNITED STATES PATENTS

| | | | |
|---|---|---|---|
| 1,268,212 | 6/1918 | Burget | 221—192 X |
| 1,370,511 | 3/1921 | Boercker | 221—254 |
| 3,310,200 | 3/1967 | Wood | 221—192 |

SAMUEL F. COLEMAN, *Primary Examiner.*

U.S. Cl. X.R.

221—254